UNITED STATES PATENT OFFICE.

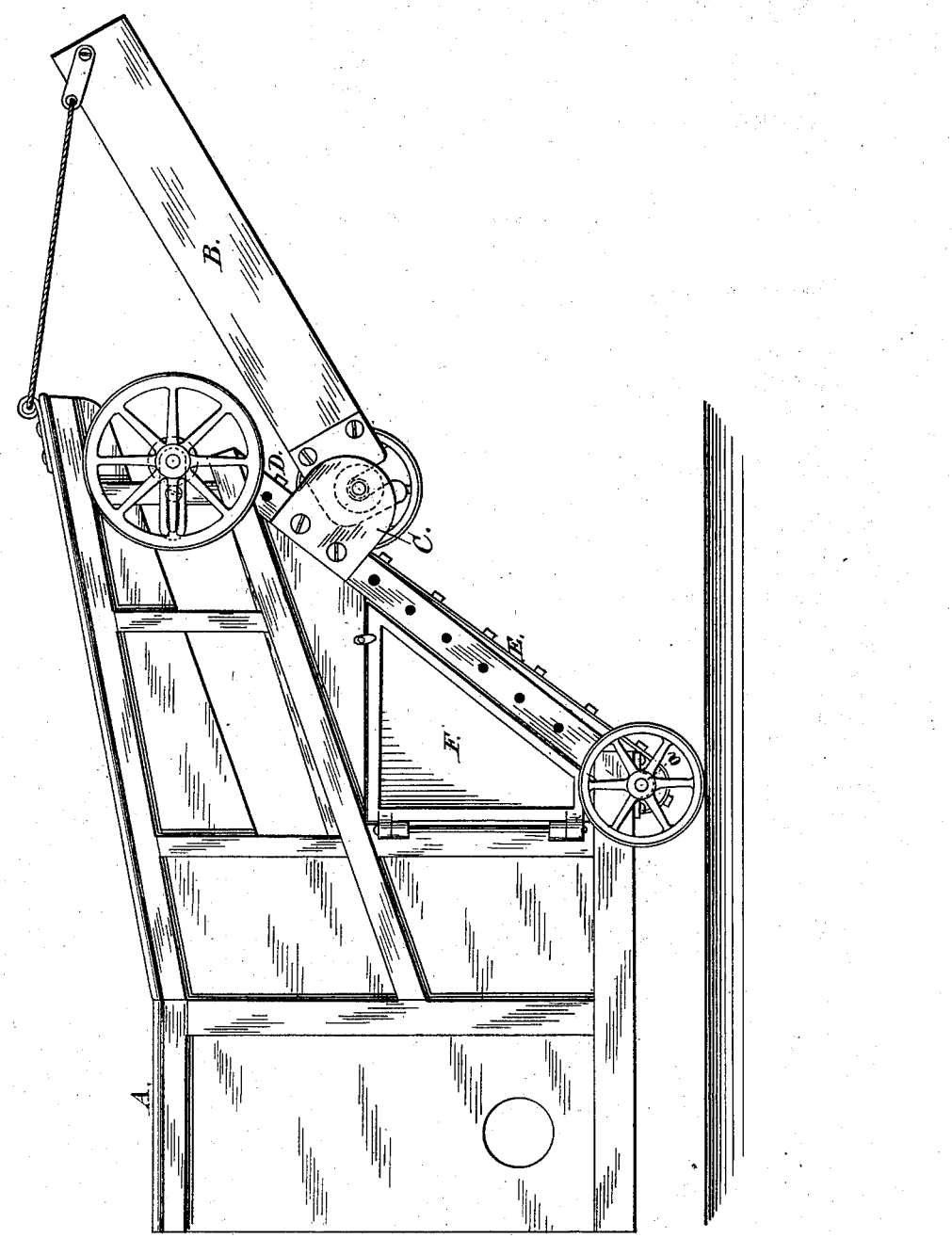

ALBERT M. SUTHERLAND, OF PENN YAN, NEW YORK, ASSIGNOR TO H. A. STROBRIDGE, OF SAME PLACE.

IMPROVEMENT IN GRAIN-SEPARATORS.

Specification forming part of Letters Patent No. 206,982, dated August 13, 1878; application filed February 4, 1878.

*To all whom it may concern:*

Be it known that I, ALBERT M. SUTHERLAND, of Penn Yan, in the county of Yates and State of New York, have invented a new and useful Improvement in Thrashers and Separators, which improvement is fully set forth in the following specification, reference being had to the accompanying drawing.

The object of my invention is to inclose the rear end of a thrasher and separator, so as to carry out of the barn all chaff and other substance from the winnower, and perform all its functions with the same efficiency whether the wind blows or not, or if it blows from any direction.

I arrange a chaff-carrier and a straw-elevator, operating in connection with the ordinary straw-carrier, in the machine, so that the straw does not fall from one to the other to expose it to the wind and blow it about the barn; and I make the supporting attachments for the straw-carrier adjustable, so that it may be attached to the machine at any convenient height to permit the use of the carrier to carry straw only, or both the straw and chaff, and to allow operators to pass freely about the machine without stooping or having the chaff blown upon them, as shown in the accompanying drawing, in which the figure is a side elevation of the rear end of the thrasher and separator with my improvement attached.

A is the rear part of the thrasher and separator. It may be constructed in any ordinary manner, and be provided with the necessary separators, straw-conveyers, and winnower, and have attached to it the supports for the straw and chaff carriers, and band-wheels and bands to operate them.

B is the straw carrier or stacker. It may be made in any ordinary manner, and have its outer end supported and adjusted by any of the well-known devices now used. The inner end is held by the supports C, as shown in the figure.

C is one of the supports for the straw-carrier at the inner end. There must be one at each side of the machine. They are made to be moved upward or downward, at will, upon the braces D, and are held to them at any position with bolts.

D is one of the braces, there being one at each side of the machine. The lower end rests upon and is fastened to the rear end of the sill of the machine. The upper end is fastened to the end of one of the side timbers of the machine, as shown in the figure. It has a series of holes through it for bolts to hold the support C to it.

E is the chaff-carrier. It may be made by passing a slatted belt around the two rollers *a*, which actuate it, or in any equivalent manner. Its use is to carry chaff from the winnower and discharge it upon the straw-carrier B.

F is a door. There is one at each side of the machine. They are opposite each other, and their position is shown in the figure. It may be attached to one of the upright timbers of the machine with hinges, so that it may be opened and closed freely at will. It is provided with a glass panel, that will allow the operators to look into the machine to see that the winnower is working properly. When these doors are closed the winnower is completely incased, so as to prevent the chaff being blown about the barn by wind from any direction.

Beneath the rear end of the winnower there is a board, extending from one side of the machine to the other, placed in a slanting position, that will allow the chaff to slide down upon the chaff-carrier.

Having thus fully described my invention, what I claim as new, and desire to secure by Letters Patent, is—

1. The straw-carrier B, having the inner ends of its frame supported in bearings C, adjustable up and down upon the braces D, so that it may be used to carry the straw only, when the chaff-carrier is removed, for the purpose of keeping the straw and chaff separate.

2. In combination with the straw-carrier B, having the inner end of its frame adjustable up and down, the chaff-carrier E, made as specified, and used conjointly to convey the chaff and straw together, as herein set forth.

ALBERT M. SUTHERLAND.

Witnesses:
JOHN L. LEWIS,
CHARLES KETCHUM.